(12) United States Patent
Hutchins et al.

(10) Patent No.: US 8,040,357 B1
(45) Date of Patent: Oct. 18, 2011

(54) QUOTIENT REMAINDER COVERAGE SYSTEM AND METHOD

(75) Inventors: Edward A. Hutchins, Mountain View, CA (US); Christopher D. S. Donham, San Mateo, CA (US)

(73) Assignee: Nvidia Corporation, Santa Clara, CA (US)

( * ) Notice: Subject to any disclaimer, the term of this patent is extended or adjusted under 35 U.S.C. 154(b) by 944 days.

(21) Appl. No.: 11/893,418

(22) Filed: Aug. 15, 2007

(51) Int. Cl.
*G09G 5/00* (2006.01)

(52) U.S. Cl. ........ 345/606; 345/607; 345/608; 345/609; 345/610

(58) Field of Classification Search ........... 345/606–610
See application file for complete search history.

(56) References Cited

U.S. PATENT DOCUMENTS

| | | | | |
|---|---|---|---|---|
| 7,034,823 | B2 * | 4/2006 | Dunnett | 345/422 |
| 7,098,924 | B2 * | 8/2006 | Prokopenko et al. | 345/581 |
| 7,408,553 | B1 | 8/2008 | Toksvig et al. | |
| 7,684,641 | B1 | 3/2010 | Toksvig | |
| 7,817,165 | B1 | 10/2010 | Donham et al. | |
| 7,876,332 | B1 | 1/2011 | Donham et al. | |
| 2006/0077209 | A1 * | 4/2006 | Bastos et al. | 345/613 |
| 2007/0146366 | A1 * | 6/2007 | Seetharamaiah et al. | 345/443 |

OTHER PUBLICATIONS

"The IEEE standard for floating point arithmetic;" at URL= http://www.psc.edu/general/software/packages/ieee/ieee.php; printed May 18, 2011; 2 pages.
Application As Filed; Filing Date of Aug. 7, 2007; U.S. Appl. No. 11/890,839.
Application As Filed; Filing Date of Dec. 20, 2006; U.S. Appl. No. 11/643,545.

* cited by examiner

*Primary Examiner* — Hau Nguyen

(57) ABSTRACT

Embodiments of the present invention pixel processing system and method provide convenient and efficient processing of pixel information. In one embodiment, quotient-remainder information associated with barycentric coordinate information indicating the location of a pixel is received. In one exemplary implementation quotient-remainder information is associated with barycentric coordinate information through the relationship c divided by dcdx, where c is the barycentric coordinate for a particular edge and dcdx is the derivative of the barycentric coordinate in the screen horizontal direction. The relationship of a pixel with respect to a primitive edge is determined based upon the quotient-remainder information. For example, a positive quotient can indicate a pixel is inside a triangle and a negative quotient can indicate a pixel is outside a triangle. Pixel processing such as shading is performed in accordance with the relationship of the pixel to the primitive.

17 Claims, 6 Drawing Sheets

250

310

Receiving quotient-remainder information

320

Determining the relationship of a pixel with respect to a line based upon the quotient-remainder information.

330

Performing pixel processing in accordance with the relationship of the pixel to the line.

FIG 3

QUOTIENT REMAINDER COVERAGE SYSTEM AND METHOD

FIELD OF THE INVENTION

The present invention relates to the field of graphics processing.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Electronic systems designed to produce these results usually involve interfacing with a user and the interfacing often involves presentation of graphical images to the user. Displaying graphics images traditionally involves intensive data processing and coordination requiring considerable resources and providing clear and concise images is often problematic.

An image is typically represented as a raster (an array) of logical picture elements (pixels). Pixel data corresponding to certain surface attributes of an image (e.g. color, depth, texture, etc.) are assigned to each pixel and the pixel data determines the nature of the projection on a display screen area associated with the logical pixel. Conventional three dimensional graphics processors typically involve extensive and numerous sequential stages or "pipeline" type processes that manipulate the pixel data in accordance with various vertex parameter values and instructions to map a three dimensional scene in the world coordinate system to a two dimensional projection (e.g., on a display screen) of an image. A relatively significant amount of processing and memory resources are usually required to implement the numerous stages of a traditional pipeline.

Rasterization is a process in which screen-space vertices of a graphics primitive are converted into pixels that cover the primitive. The process is usually very complicated and can attempt to deal with multiple pixels in a clock cycle. However, resources (e.g., processing capability, storage resources, etc.) of devices and systems that perform the rasterization are usually relatively limited. These limitations can make retrieving, coordinating and manipulating information associated with a final image rendered or presented on a display very difficult or even impossible. In addition, traditional graphics information processing can consume significant power and be a significant drain on limited power supplies, such as a battery.

Despite the complication of many traditional rasterization processes the end user typically expects precise and clear graphics. Traditionally, rasterization is implemented by techniques such as "edge walking", where the location of pixels along a triangle edge are incrementally stepped from one vertex to another. Conventional approaches to "edge walking" often have limitations. For example, unless the pixel locations are computed from an absolute location, errors in the computation can accumulate resulting in a long edge having significant errors by the end of the edge. Traditionally attempts at overcoming error problems include using edge walkers which walk along the step axis of the edge where a step of a single pixel is guaranteed to traverse a distance of no more than a single pixel along the non-step axis. The axis used for scan line generation changes depending on which is the step axis of an edge defining a rasterization for an edge slope, resulting in walking vertically sometimes and horizontally sometimes.

Another technique for rasterization is to compute a bounding box for the triangle, and then rasterize tiles within that bounding box using a smart algorithm that examines which edges of the tile the triangle crosses to determine which direction to move for the next tile. Tiling techniques can encounter difficulties in that there are situations where such a heuristic cannot determine where the next tiles are that contain visible pixels. As a result, time is wasted on tiles that do not have coverage. Another problem is that it is difficult to produce an even rasterization pattern using such a heuristic. Instead, the tiles tend to have skips as rasterization jumps from one end of a line to another. Such skips commonly result in inefficient memory accesses for graphics operations such as depth test, texturing, etc.

Traditional walking techniques typically add significant hardware in order to prevent artifacts, particularly when dealing with fractions. Some portion of a floating point value associated with the fraction is often truncated. These truncated portions can accumulate as a line is a walked and gaps or cracks begin to appear at the boarders of rendered primitives.

SUMMARY

Embodiments of the present invention pixel processing system and method provide convenient and efficient processing of pixel information. In one embodiment, quotient-remainder information is received. The quotient-remainder information can be associated with barycentric coordinate information indicating the location of a pixel relative to a primitive (e.g., triangle parallelogram, etc.) edge. In one exemplary implementation, quotient-remainder information is associated with barycentric coordinate information defined by the relationship c divided by dcdx, where c is the barycentric coordinate for a particular edge and dcdx is the derivative of the barycentric coordinate in the screen horizontal direction. The relationship of a pixel with respect to a line based upon the quotient-remainder information is determined.

In one embodiment, the line is associated with an edge of a triangle and a positive quotient or negative quotient characteristic indicates a pixel is inside a triangle or outside a triangle. Pixel processing is performed in accordance with the relationship of the pixel. In one exemplary implementation, pixels within a primitive are forwarded for shading processing in accordance with the primitive attributes and pixels outside a primitive are not forwarded for shading.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 3 is a flow chart of an exemplary quotient remainder coverage graphics method in accordance with one embodiment of the present invention.

DETAILED DESCRIPTION

Figure 1A:
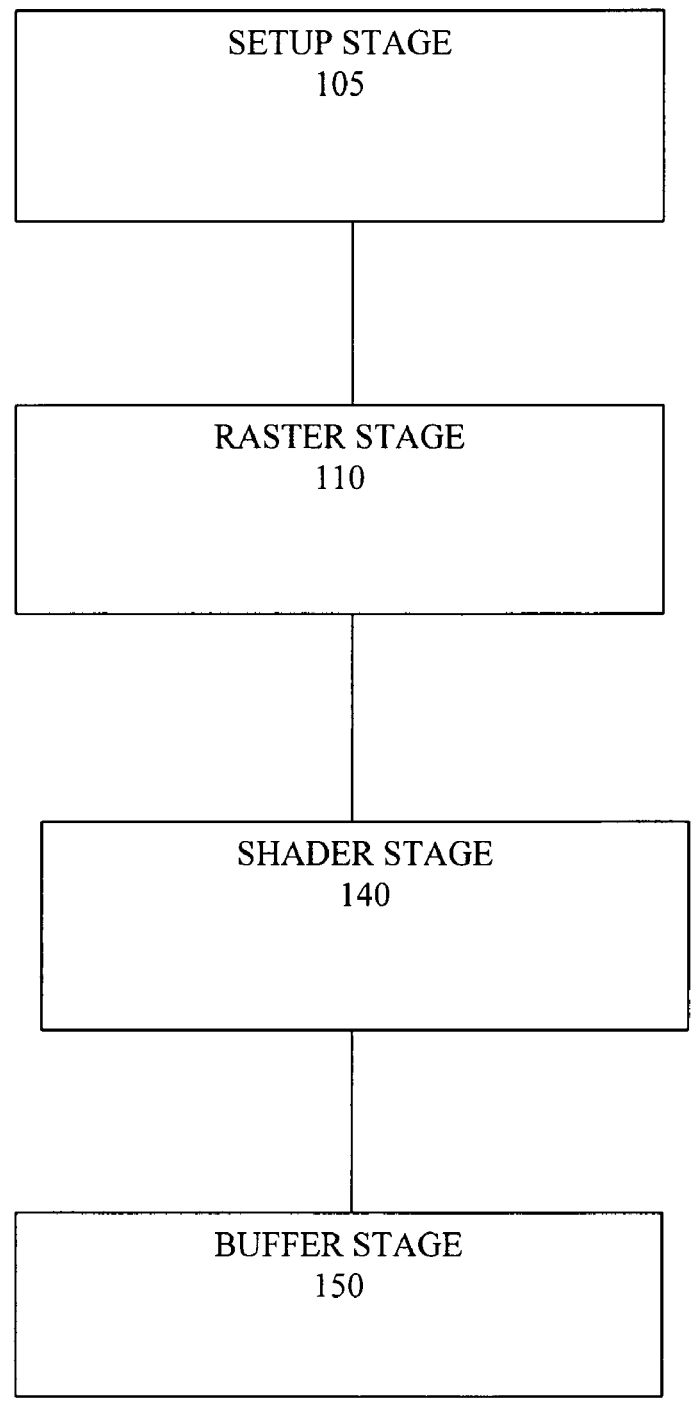
FIG. 1A is a block diagram of an exemplary graphics pipeline in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, logic, other such information storage, transmission or display devices, etc.) into other data similarly represented as physical quantities within other components.

Exemplary Notation Description

In one embodiment, information is configured and utilized in a "quotient remainder (QR) notation". In one embodiment, the quotient remainder notation information includes three components: a quotient (Q) value, a remainder (R) value, and a divisor (D) value. The values or components of the QR notation information can correspond to a single (real, rational, irrational) conventional number T representation of the quantity. In one exemplary implementation, the correspondence of the QR notation values Q, R, and D to the quantity T can be expressed by the relationship:

$$T = Q + R/D \quad [\text{Exp. 1}]$$

The quotient (Q) value contains the integer portion of the quantity. The remainder (R) and divisor (D) values when divided (R/D) express a fractional portion of the quantity. For example, if the number T is 4/3 it can be represented in QR-Notation as Q=1, R=1, D=3. Using formula [EQ1] above, Q=1, R=1, D=3, can be converted to a conventional number 1+1/3 which is equal to 4/3.

One key feature of QR-Notation is that a rational number can be represented precisely in this form. For example, in a typical 32-bit computer number format such as an ANSI/IEEE Standard 754-1985 "Standard for Binary Floating Point Arithmetic", a number is represented with 23 bits of mantissa and a fixed divisor. Hence the quantity 4/3 is represented in this format as an implied one plus 2796203/8388608 or 1.0+ 2796203/8388608, which has an error of approximately 0.000000397. On the other hand, in Q-R Notation with 2 bits available for each of Q, R, and D, the quantity 4/3 can be preserved exactly with Q=1, R=1, D=3.

In one embodiment, a variety of operations can be performed using QR-Notation without loss of precision. For example, two quantities A and B represented in a QR-Notation configuration can be added if they share a common D resulting in a third new quantity C represented in QR-Notation:

$$C_R = A_R + B_R$$

$$C_Q = A_Q + B_Q$$

$$C_D = A_D = B_D$$

The sign of a QR-Notation information can be changed. In one exemplary implementation, computing the negative of a QR-Notation number involves switching the sign of Q and D (but not R) as illustrated by the following operations:

$$(-1) * C = (-1) * (C_Q + C_R/C_D)$$
$$= -C_Q + (-1) * C_R/C_D$$
$$= -C_Q + C_R/-C_D$$

Similar operations can be used to demonstrate that subtracting one from Q while adding D to R does not change the value of a QR-Notation, thus defining a procedure which can be used to normalize QR-Notation to a particular range of R values (e.g., compute QR-Notation numbers such that R is positive and less than the absolute value of D).

Exemplary Embodiments

In one embodiment, efficient and convenient graphics data organization and processing are enabled. In one exemplary implementation, processing of graphics information is simplified by utilizing QR-notation to indicate the location of primitive boundaries in screen space. For example, barycentric coordinate information associated with a pixel location can be stored and processed in QR-form to indicate the relationship between the pixel and the edges of a primitive (e.g. inside the primitive or outside the primitive). Specifically, dividing the barycentric coordinate (c) at a given pixel by the derivative of the barycentric coordinate with respect to screen space X (dc/dx) results in the distance from the pixel to the associated primitive edge. A present invention graphics system and method can facilitate presentation of graphics images with a reduced amount of resources dedicated to graphics information processing and can also facilitate increased power conservation. In one embodiment, utilization of the quotient remainder form reduces error accumulation as a value is stepped farther and farther from its point of generation.

FIG. 1A is a block diagram of an exemplary graphics pipeline 100 in accordance with one embodiment of the present invention. Graphics pipeline 100 facilitates efficient and effective utilization of processing resources. In one embodiment, graphics pipeline 100 processes graphics information in an organized and coordinated manner. Graphics pipeline 100 can be implemented as a graphics processing core in a variety of different components (e.g., in a graphics processing chip, in an application specific integrated circuit, a central processing unit, integrated in a host processing unit, etc.). Various aspects of graphics pipeline 100 and other embodiments of the present invention are described in portions of the following description as operating upon graphics primitives, (e.g., triangles) as a matter of convenient convention. It is appreciated that the present invention is readily adaptable and can be also implemented utilizing a variety of other geometrical primitives.

Graphics pipeline 100 includes setup stage 105, raster stage 110, shader stage 140 and buffer stage 150. In one embodiment of the present invention, a host provides graphics pipeline 100 with vertex data (e.g., points in three dimensional space that are being rendered), commands for rendering particular triangles given the vertex data, and programming information for the pipeline (e.g., register writes for loading instructions into different graphics pipeline 100 stages). The stages of graphics pipeline 100 cooperatively operate to process graphics information.

Setup stage 105 receives vertex data and prepares information for processing in graphics pipeline 100. Setup stage 105 can perform geometrical transformation of coordinates, perform viewport transforms, perform clipping and prepare perspective correct parameters for use in raster stage 110, including parameter coefficients. In one embodiment, the setup unit applies a user defined view transform to vertex information (e.g., x, y, z, color and/or texture attributes, etc.) and determines screen space coordinates for each triangle. Setup stage 105 can also support guard-band clipping, culling of back facing triangles (e.g., triangles facing away from a viewer), and determining interpolated texture level of detail (e.g., level of detail based upon triangle level rather than pixel level). In addition, setup stage 105 can collect statistics and debug information from other graphics processing blocks. Setup stage 105 can include a vertex buffer (e.g., vertex cache) that can be programmatically controlled (e.g., by software, a driver, etc.) to efficiently utilize resources (e.g., for different bit size word vertex formats). For example, transformed vertex data can be tracked and saved in the vertex buffer for future use without having to perform transform operations for the same vertex again. In one exemplary implementation, setup stage 105 is a floating point Very Large Instruction Word (VLIW) machine that supports 32-bit IEEE Standard 754-1985 float point, signed 15-bit integer with 16-bit fraction fixed point and packed 8-bit fraction fixed point formats.

In one embodiment, setup stage 105 computes barycentric coefficients for raster stage 110. In one exemplary implementation of setup stage 105, the barycentric coordinates for a pixel at the edge of the screen for each of the three edges in a triangle are divided by their horizontal derivative. This number (e.g., "c_dcdx") indicates for each of the triangle edges, the number of pixels from the pixel at the screen edge to the associated triangle edge measured horizontally. The setup stage 105 may also compute the change in c_dcdx for each vertical step by computing dcdy/dcdx (e.g. dcdy_dcdx). In this example, the rasterizer adds dcdy_dcdx to c_dcdx to step the c_dcdx value vertically. With each step, the c_dcdx value indicates the number of pixels to the associated edge of the triangle.

Raster stage 110 determines which pixels correspond to a particular triangle and interpolates parameters from setup stage 105 associated with the triangle to provide a set of interpolated parameter variables and instruction pointers or sequence numbers associated with (e.g., describing) each pixel. For example, raster stage 100 can provide a "translation" or rasterization from a triangle view to a pixel view of an image. In one embodiment, raster stage 110 scans or iterates each pixel in an intersection of a triangle and a scissor rectangle. For example, raster stage 110 can process pixels of a given triangle and determine which processing operations are appropriate for pixel rendering (e.g., operations related to color, texture, depth and fog, etc.).

In one embodiment, raster stage 110 calculates barycentric coordinates for pixel packets. In a barycentric coordinate system, distances in a triangle are measured with respect to its vertices. The use of barycentric coordinates reduces the required dynamic range, which permits using fixed point calculations that require less power than floating point calculations. In one embodiment, the distance to a line or edge of a primitive is defined by the expression "c/dcdx" where "c" is a barycentric coordinate for a particular edge, and "dcdx" is the derivative of the barycentric coordinate in the screen or display horizontal direction. The "c/dcdx" expression is stored and processed in a Q+R/D notation. In one exemplary implementation, the discrete values of Q, R and D are stored precisely. The utilization of the discrete Q, R and D values facilitates reduction in issues associated with the accumulation of error as a value is stepped farther and farther from its point of generation since the Q, R, and D values precisely describe the result of the c/dcdx division.

In one embodiment, the location indication "c/dcdx' is stepped both vertically and horizontally to determine which pixels are inside or outside of the triangle. In one exemplary implementation, the quotient remainder expression of "c/dcdx" includes Q+R/D. The Q variable is the quotient truncated to an integer of "c/dcdx" has enough bits to represent the largest ratio of c to dcdx. The ratio can be the horizontal screen size. The R variable is the remainder computed as "c modulo dcdx" and has enough bits to represent the largest divisor D. In one embodiment of a general form of the expression, the numbers Q, R, and D are signed.

In one embodiment, the notation is restricted to simplify the expression. In one exemplary implementation, the sign of the quotient remainder expression is flipped by flipping the sign of Q and D but not R. This can be done by multiplying the expression by negative 1.

It is appreciated that present invention QR notation can be utilized in the rasterization of lines associated with a variety of different types of primitives (e.g., triangle, parallelograms, polygons, etc.). For example, the primitives can have a variable number of sides or edges. The QR notation can be utilized to determine locations of both in edges and out edges for different types of primitives. In one embodiment, the location of the lines or edges the primitives are determined with respect to a side (e.g., left side, right side, top side, or bottom side) of a presentation or display screen. In one exemplary implementation, an in edge is an edge that is encountered without first going through the "internal body" of the primitive and an out edge is an edge that is encountered after going through the "internal body" of the primitive. It is appreciated that the QR notation stepping can account for primitives with edges do not appear on the display screen (e.g., a primitive that is partially on the display screen and partially not).

Figure 1B:
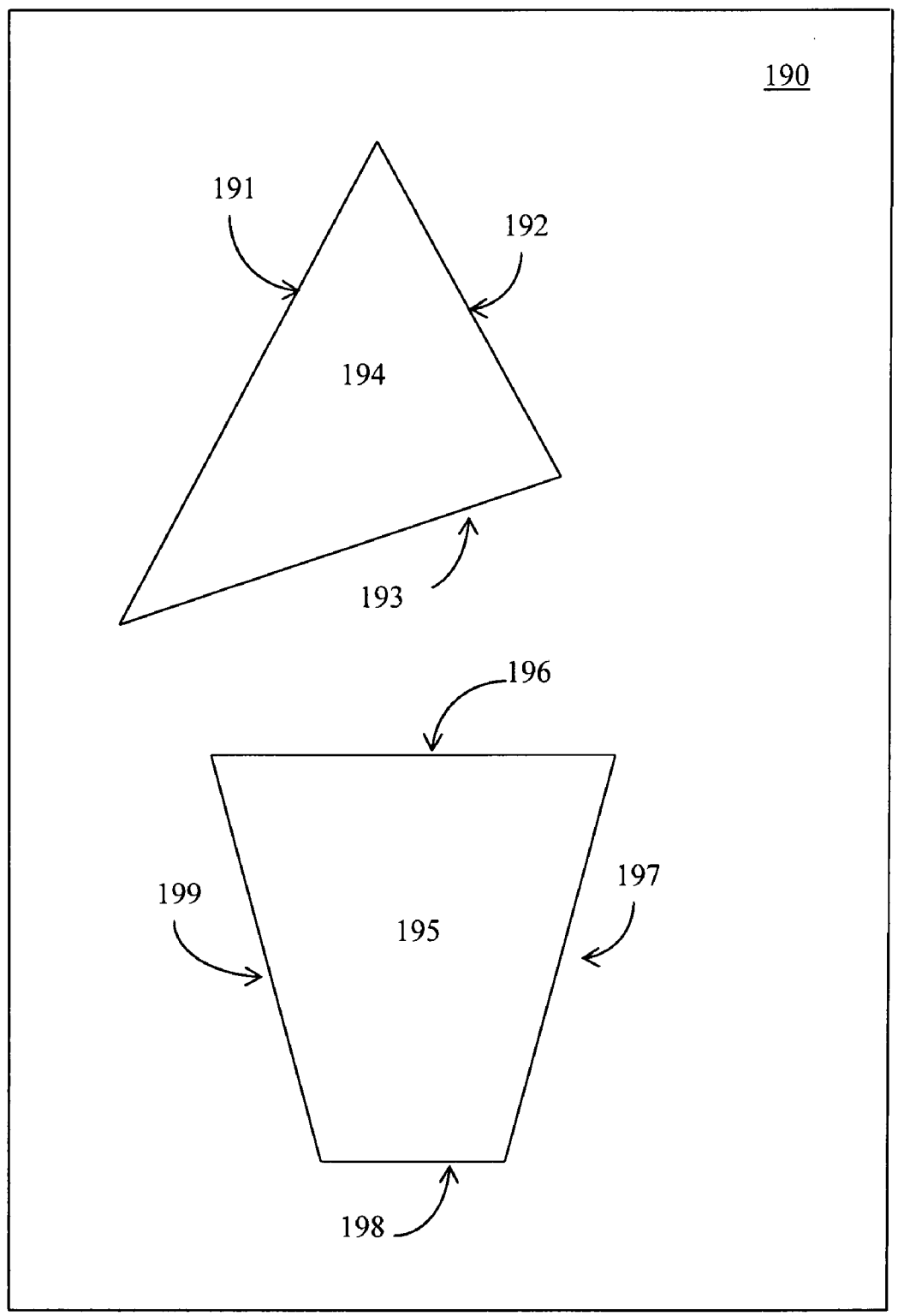
FIG. 1B is a block diagram of exemplary primitive configurations in accordance with one embodiment of the present invention.

FIG. 1B is a block diagram of exemplary primitives presented on a display screen 190 in accordance with one embodiment of the present invention. The relationships of "in" edges versus "out" edges are presented. Traversing from the left side of the display screen 190 in a direction towards the right side of display screen 190, edges 191 and 199 are encountered before entering the respective primitives 194 and 195 and thus edges 191 and 199 are considered in edges. Edges 192, 193 and 197 are encountered after entering the respective primitives 194 and 195 and thus edges 192, 193 and 197 are considered out edges. Edges 196 and 198 are horizontal edges and in one exemplary implementation a top horizontal edge 196 is considered an in edge and a bottom horizontal edge 198 is considered an out edge.

With respect to QR notation information, for in-edge 191 of primitive 194 and in edge 199 of primitive 195, the derivative of the barycentric, dcdx, is positive since moving to the right makes the barycentric coordinate transition from negative to positive. For the out-edges 192 and 193 of primitive 194 and out edge 197 of primitive 195, the derivative of the barycentric, dcdx, is negative since moving to the right makes the barycentric coordinate transition from positive to negative. The following table summarizes these relationships for a point to the left of the triangle in one exemplary implementation:

|  | c | dcdx | c_dcdx |
|---|---|---|---|
| In-edge | negative | positive | negative |
| Out-edge | positive | negative | negative |

For an in-edge, a negative c_dcdx means that the point is to the left of the primitive whereas for an out-edge, a negative c_dcdx means that the point is to the right of the primitive.

In one embodiment, the dcdx value for horizontal edges is 0 since moving horizontally does not get any closer to or further from the horizontal edge. In one exemplary implementation, the Q value of QR notation information for horizontal edges is chosen to correspond to the distance vertically the edge. The vertical distance can be with respect to the top side of a display screen and traversing towards the bottom side can indicate an in edge (e.g., a top horizontal line) is traversed before the "internal body" of the primitive and an out edge (e.g., a bottom edge) is traversed after the "internal body" of the primitive.

In one embodiment, it is simpler to just have negative numbers mean that the point is to the left of the triangle and positive numbers mean that the point is to the right the triangle. To achieve this, when dcdx is negative (e.g. for out-edges) the sign of c_dcdx is flipped. In one exemplary implementation, this is achieved by changing the sign of Q and D as was described in the QR-Notation section. In one embodiment, after an initial signed computation of R, the resulting QR number can be normalized by adding or subtracting D so that the resulting R is positive and in the range of 0 to D.

In one embodiment, raster stage 110 also generates pixel packets utilized in graphics pipeline 100. Each pixel packet can include one or more rows and each row includes a payload portion and a sideband portion. A payload portion can include fields for various values including interpolated parameter values or pixel surface attributes (e.g., color, texture, depth, fog, (x, y) location, etc.). The sideband portion can include instruction sequence numbers associated with the pixel processing and a status field (e.g., kill field).

It is appreciated that raster stage 110 can also support guard band coordinates (facilitating reduction of clipping operations) and power reduction programming, and faster rendering of simple drawing tasks, as compared to a hard-coded rasterizer unit in which features consume time or power (or both) whether or not they are being used. In one exemplary implementation, raster stage 110 is compatible with Open GL-ES and D3DM rasterization rules.

Shading operations are performed at shader stage 140. In one exemplary implementation a variety of different operations are performed on pixel data. For example, shader stage 140 can execute shader operations (e.g., blending and combining) related to three-dimensional graphics including texture combination (texture environment), stencil, fog, alpha blend, alpha test, and depth test. Shader stage 140 can have multi-cycle latency per substage and therefore can perform a variety of arithmetic and/or logic operations (e.g., A*B+C*D) on the pixel surface attribute information to achieve shading coordination. In one exemplary implementation, shader stage 140 performs operations on scalar values (e.g., a scalar value associated with pixel surface attribute information). In one embodiment, shader stage 140 includes atrast operations.

Buffer stage 150 sends color and Z-depth results out to memory (e.g., memory 133). Buffer stage 150 is a general purpose or universal flexibly programmable data write stage. In one embodiment, buffer stage 150 process pixel packet rows. In one exemplary implementation of buffer stage 150 the processing includes recirculating pixel packet rows in the pipeline and notifying other stages of killed pixels.

Figure 2A:
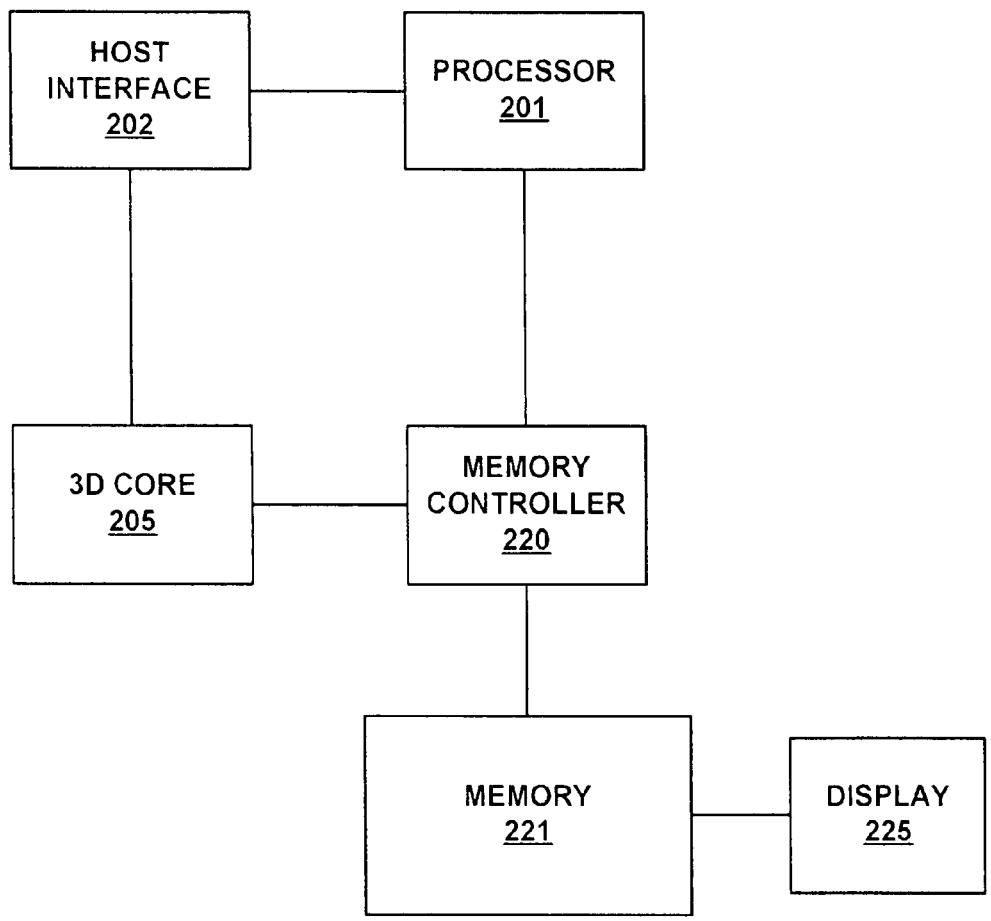
FIG. 2A shows an exemplary computer system in accordance with one embodiment of the present invention.

With reference now to FIG. 2A, a computer system 200 in accordance with one embodiment of the present invention is shown. Computer system 200 may provide the execution platform for implementing operations or certain software-based functionality of the present invention. As depicted in FIG. 2A, the computer system 200 includes a CPU 201 coupled to a 3-D processor 205 via a host interface 202. The host interface 202 translates data and commands passing between the CPU 201 and the 3-D processor 205 into their respective formats. Both the CPU 201 and the 3-D processor 205 are coupled to a memory 221 via a memory controller 220. In the system 200 embodiment, the memory 221 is a shared memory, which refers to the property whereby the memory 221 stores instructions and data for both the CPU 201 and the 3-D processor 205. Access to the shared memory 221 is through the memory controller 220. The shared memory 221 also stores data comprising a video frame buffer which drives a coupled display 225.

As described above, certain processes and steps of the present invention are realized, in one embodiment, as a series of instructions (e.g., software program) that reside within computer readable memory (e.g., memory 221, CD, etc,) of a computer system (e.g., system 200) and are executed by the CPU 201 and graphics processor 205 of system 200. When executed, the instructions cause the computer system 200 to implement the functionality of the present invention including performing operations on QR notation information.

As shown in FIG. 2A, system 200 shows the basic components of a computer system platform that may implement the functionality of the present invention. Accordingly, system 200 can be implemented as, for example, a number of different types of portable handheld electronic devices. Such devices can include, for example, portable phones, PDAs, handheld gaming devices, and the like. In such embodiments, components would be included that are designed to add peripheral buses, specialized communications components, support for specialized IO devices, and the like.

Figure 2B:
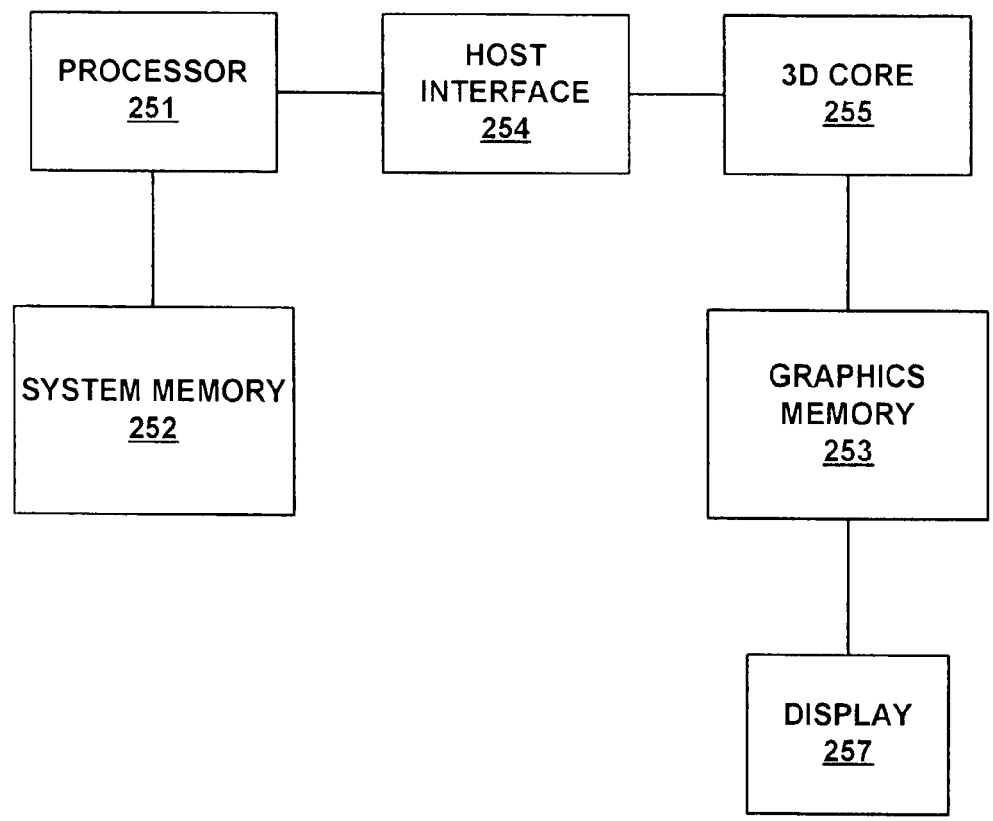
FIG. 2B shows another exemplary computer system in accordance with one alternative embodiment of the present invention.

Additionally, it should be appreciated that although the components 201-257 are depicted in FIGS. 2A and 2B as a discrete components, several of the components can be implemented as a single monolithic integrated circuit device (e.g., a single integrated circuit die) configured to take advantage of the high levels of integration provided by modern semiconductor fabrication processes. For example, in one embodiment, the CPU 201, host interface 202, 3-D processor 205, and memory controller 220 are fabricated as a single integrated circuit die.

FIG. 2B shows a computer system 250 in accordance with one alternative embodiment of the present invention. Computer system 250 is substantially similar to computer system 200 of FIG. 2A. Computer system 250, however, utilizes the processor 251 having a dedicated system memory 252, and the 3-D processor 255 having a dedicated graphics memory 253. Host interface 254 translates data and commands passing between the CPU 201 and the 3-D processor 255 into their respective formats. In the system 250 embodiment, the system memory 251 stores instructions and data for processes/threads executing on the CPU 251 and graphics memory 253 stores instructions and data for those processes/threads executing on the 3-D processor 255. The graphics memory 253 stores data for the video frame buffer which drives the display 257. As with computer system 200 of FIG. 2A, one or more of the components 251-253 of computer system 250 can be integrated onto a single integrated circuit die.

FIG. 3 is a flow chart of graphics method 300 in accordance with one embodiment of the present invention. In one embodiment, graphics method 300 facilitates efficient processing of pixel information. In one exemplary implementation, graphics method 300 utilizes quotient—remainder notation to determine barycentric coordinate location of pixels with respect to a primitive. The quotient remainder notation is utilized in pixel processing to determine the location of primitive boundaries which are identified when stepping off pixels of a screen presentation.

In block 310, quotient-remainder information is received. In one embodiment the quotient-remainder information is associated with barycentric coordinate information indicating the location of a pixel. In one exemplary implementation, quotient-remainder information is associated with barycentric coordinate information through the relationship c divided by dcdx, where c is the barycentric coordinate for a particular edge and dcdx is the derivative of the barycentric coordinate in the screen horizontal direction.

In block 320, the relationship of a pixel with respect to a line based upon the quotient-remainder information is determined. In one embodiment, the line is associated with an edge of a triangle. In one exemplary implementation, a positive quotient indicates a pixel is inside a triangle and a negative quotient indicates a pixel is outside a triangle.

In one embodiment, various operations are performed to simplify quotient-remainder notation information. For example, quotient-remainder notation information can be simplified by flipping the sign of the quotient.

In block 330, pixel processing is performed in accordance with the relationship of the pixel. In one embodiment, pixels within a primitive are forwarded for shading processing in accordance with the primitive attributes and pixels outside a primitive are not forwarded for shading based upon the primitive's attributes.

In one embodiment, QR notation rasterization is performed a quad (e.g., 2×2 pixels, 2×4 pixels, 4×4 pixels etc.) at a time. In one exemplary implementation, the rasterization is performed in two stages, a coarse stage and a fine stage. For each row of pixel quads the coarse stage gives the in edge distance and the out edge distance and the fine stage steps the pixels within the edges. In one embodiment, a Coarse stage does a fixed amount of work for each quad row of pixels. For example, if there are 10 quads in a row the coarse stage forwards an indication to the fine stage whether an edge is in or out for the quad and fine rasterizes the quads that have pixels within the primitive.

Figure 4:
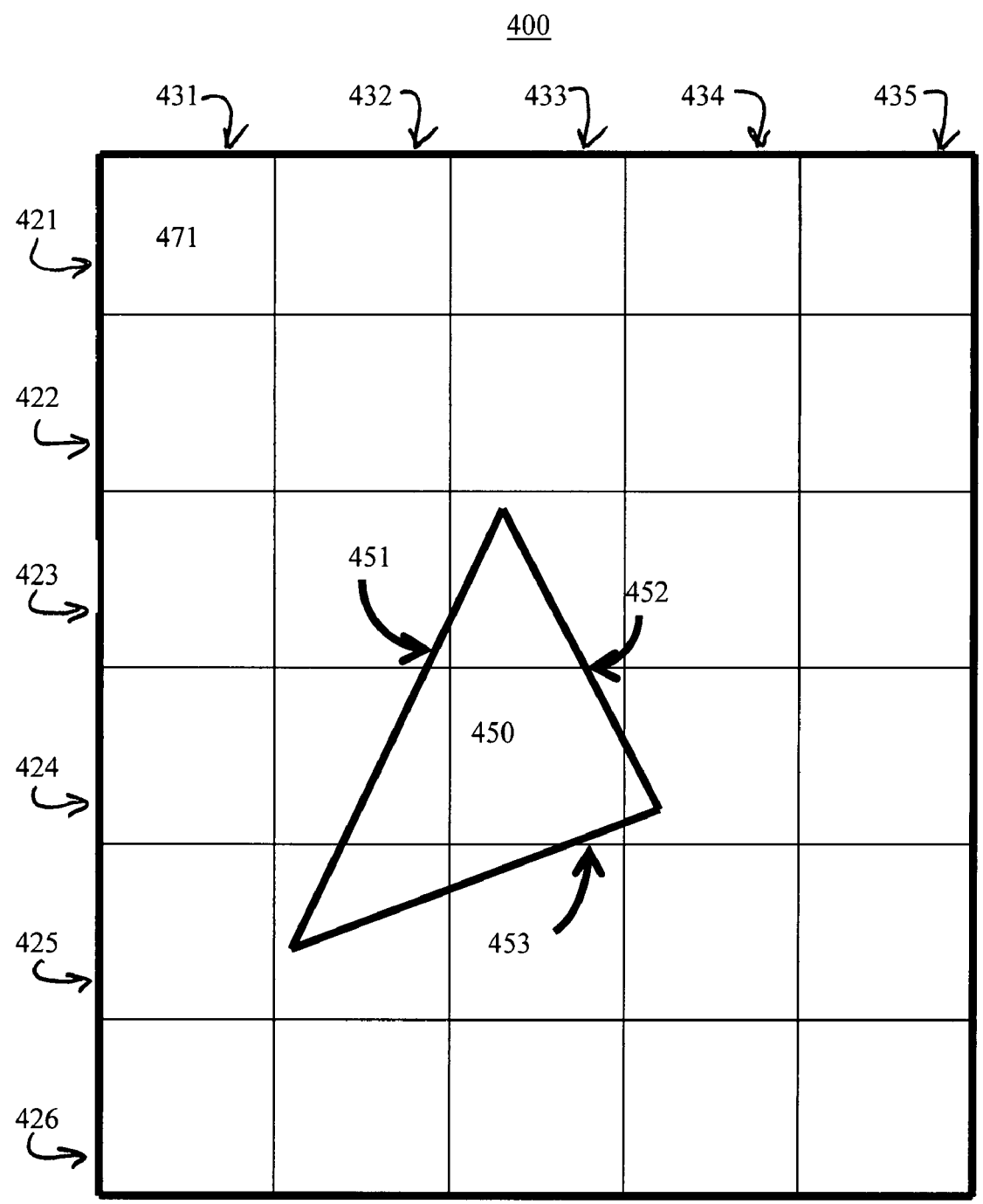
FIG. 4 is a block diagram of an exemplary screen presentation in accordance with one embodiment of the present invention.

FIG. 4 is a block diagram of exemplary screen presentation 400 in accordance with one embodiment of the present invention. Screen presentation 400 includes primitive 450 which is shown in relation to the pixel quads, shown typically as 471. Screen presentation 400 has pixel quads arranged in an array of rows 421, 422, 423, 424, 425 and 426, and columns 431, 432, 433, 434, and 435. A coarse raster stage utilizes QR notation information describing the edges 451, 452 and 453 to determine edge 451 is an in edge and edges 452 and 453 are out edges. The coarse raster stage forwards an indication to the fine raster stage that in edge 451 is in quads at rows 423, 424 and 425 and columns 432 and 433. The coarse raster stage also forwards an indication to the fine raster stage that out edges 452 and 453 are in quads at rows 423, 424 and 425 and columns 432, 433 and 434. Fine raster stage steps the quads that touch on a portion of the primitive can ignore the other quads (e.g., in rows 421, 422 and 426 and columns 431 and 435) for purpose of rasterizing primitive 450.

It is appreciated there are a variety of operations that can be performed on QR notation information. In one embodiment, given a numerator (top) and denominator (bot) of a fraction, QR notation values $(A_Q, A_R, A_D)$ are created by the following operations:

If(bot!=0){

$A_Q$=top/bot;

$A_R$=top % bot;

Int$ss$=(bot>=0)?1:-1;//If bot is negative, flip the sign of the divide.

$A_D$=bot*$ss$;

$A_Q$=$A_Q$*$ss$;

}else{

$A_Q$=top;

$A_R$=0;

$A_D$=0;

}.

In one embodiment, normalizing QR notation information involves subtracting or adding D to the remainder until the remainder is between 0 and D. In one exemplary implementation, the normalization includes the following operations:

While($A_R$<0){

$A_R=A_R+A_D$;

$A_R=A_Q-1$;

}

While($A_R$>$A_D$){

$A_R=A_R-A_D$;

$A_Q=A_Q+1$

}.

In one embodiment, when performing addition operations as described above in the exemplary notation description, if the remainder ($C_R$) has overflow, then the quotient ($C_Q$) can be adjusted up or down after the addition. In one exemplary implementation the overflow is at most D, so the normalization involves adding or subtracting one from $C_Q$ and adjusting $C_R$ appropriately as described above in the normalization operations.

Multiplication operations can also be performed on QR notation information. In one embodiment, given QR notation information, multiplication can be performed as a succession of additions, or through multiplying Q and R as follows:

$C_R=A_R*K$ $C_Q=A_R*K$

In some situations there can be a large remainder overflow resulting complex renormalization operations being performed. In one exemplary implementation, multiple iterations are involved as opposed to just one of an addition case. Again the overflow can be addressed with reference to the normalization operations described above.

In one embodiment, QR notation information is multiplied by a fraction of the form "num/den" where den is a power of two by the following operations:

Frac$Q=(A_Q*$num$)$&(den$-1$)

$C_Q=A_Q*$num/den $C_R=$Frac$Q*A_D+A_R*$num $C_D=A_D*$den

Thus the present invention facilitates efficient and accurate processing of information. The present invention can enable presentation of graphics information with minimal or no glitches associated with precision loss. Pixel information in a QR notation can be stored and processed with a smaller number of bits.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. In the claims, the order of elements does not imply any particular order of operations, steps, or the like, unless a particular element makes specific reference to another element as becoming before or after.

What is claimed is:

1. A graphics method comprising:
   receiving quotient-remainder notation information, wherein said quotient-remainder notation information is associated with barycentric coordinate information indicating the location of said pixel and wherein said quotient-remainder notation information is associated with barycentric coordinate information through the relationship c divided by dcdx, where c is the barycentric coordinate for a particular edge and dcdx is the derivative of the barycentric coordinate in the screen horizontal direction;
   determining the relationship of a pixel with respect to a line based upon said quotient-remainder notation information; and
   performing pixel processing in accordance with said relationship of said pixel to said line.

2. A graphics method of claim 1 wherein said line is associated with an edge of a primitive.

3. A graphics method of claim 2 wherein a positive quotient indicates a pixel is inside a triangle.

4. A graphics method of claim 2 wherein a negative quotient indicates a pixel is outside a triangle.

5. A graphics method of claim 2 wherein a quotient remainder notation is simplified by flipping the sign of the quotient.

6. A graphics method of claim 2 wherein said primitive is a triangle and said QR notation information includes QR notation information corresponding to each side of said triangle.

7. A graphics method of claim 2 wherein said primitive is a parallelogram and said QR notation information includes QR notation information corresponding to each side of said parallelogram.

8. A graphics method of claim 2 wherein said quotient remainder notation is utilized in pixel processing in which the location of primitive boundaries are identified when stepping off pixels of a screen presentation.

9. A computer system comprising
   a memory for storing quotient-remainder notation information, wherein said quotient-remainder information is associated with barycentric coordinate information through the relationship c divided by dcdx, where c is the barycentric coordinate for a particular edge and dcdx is the derivative of the barycentric coordinate in the screen horizontal direction; and
   a processor for processing information including determining the location of a pixel based upon a quotient-remainder notation; said processor coupled to said memory.

10. The computer system of claim 9 wherein said processor forwards pixel location information to a display.

11. The computer system of claim 9 wherein said quotient-remainder information is associated with barycentric coordinate information indicating the location of said pixel.

12. The computer system of claim 9 wherein pixel location is determined with respect to an edge of a primitive.

13. The computer system of claim 9 wherein a positive quotient indicates a pixel is inside a triangle and a negative quotient indicates a pixel is outside a triangle.

14. A graphics pipeline comprising:
   a setup stage for receiving vertex data and preparing information for processing said graphics pipeline including setting up barycentric coefficients;
   a raster stage for determining which pixels correspond to a particular primitive utilizing a quotient-remainder notation and interpolating parameters from said setup module associated with said primitive to provide a set of interpolated parameter variables and instruction pointers or sequence numbers associated with a pixel; and a shader stage for performing shading operations.

15. A graphics pipeline of claim 14 wherein said raster stage directs stepping of pixels both vertically and horizontally utilizing quotient remainder notation information and determines which pixels are inside or outside of a primitive.

16. A graphics pipeline of claim 14 wherein the distance to a line or edge of a primitive is defined by the expression "c/dcdx", where "c" is a barycentric coordinate for a particular edge and "dcdx' is the derivative of the barycentric coordinate in the screen or display horizontal direction.

17. A graphics pipeline of claim 16 wherein for an in-edge, a negative c/dcdx means that the point is outside of said primitive whereas for an out-edge, a negative c/dcdx means that the point is inside said primitive.

* * * * *